United States Patent [19]
Gaytan et al.

[11] Patent Number: 5,638,367
[45] Date of Patent: Jun. 10, 1997

[54] APPARATUS AND METHOD FOR DATA PACKING THROUGH ADDITION

[75] Inventors: Andre J. Gaytan, Union City; Louise Yeung, Redwood City, both of Calif.

[73] Assignee: Sun Microsystems, Inc., Calif.

[21] Appl. No.: 498,620

[22] Filed: Jul. 7, 1995

[51] Int. Cl.$^6$ .................................................. H04J 3/16
[52] U.S. Cl. ........................ 370/471; 395/284; 370/472; 370/476
[58] Field of Search ........................... 370/82, 83, 99, 370/105.1, 60, 94.1, 470, 472, 476, 506, 355, 394; 341/67; 395/284, 292, 307, 310

[56] References Cited

U.S. PATENT DOCUMENTS

| | | | |
|---|---|---|---|
| 3,602,896 | 8/1971 | Zeheb | 340/172.5 |
| 5,079,548 | 1/1992 | Fujiyama et al. | 341/67 |
| 5,471,632 | 11/1995 | Gavin et al. | 395/284 |
| 5,535,221 | 7/1996 | Hijikata et al. | 370/82 |

*Primary Examiner*—Douglas W. Olms
*Assistant Examiner*—Shick Hom
*Attorney, Agent, or Firm*—Blakely Sokoloff Taylor & Zafman

[57] ABSTRACT

A scalable packing circuit used to byte pack data transferred from a first storage element to a second storage element. The packing circuitry comprises a word packing circuit which receives data packets of a first bit width and stores them as data packets of a second bit width equivalent to the bit width of the second storage element. Concurrently, the word packing circuit eliminates invalid words included within the data packets from the first storage element. The packing circuit also includes a byte packing circuit which removes invalid bytes within the data packets of the second bit width before transferring the data to the second storage element for contiguous storage.

22 Claims, 13 Drawing Sheets

APPARATUS AND METHOD FOR DATA PACKING THROUGH ADDITION

BACKGROUND OF THE INVENTION

1. Field of the Invention

The present invention relates to the field of data transfer. More particularly, the present invention relates to an apparatus and method for packing data through addition in order to improve overall system performance.

2. Description of Art Related to the Invention

It is well known that computers systems as well as other "intelligent" systems include host memory. Typically, host memory includes a number of data buffers of an arbitrary byte size residing within a predetermined address range. These data buffers are uniquely addressed within the predetermined address range to allow selective access to the data stored within the data buffers for subsequent processing or transmission. Depending on the byte size of the data buffers and its byte availability, a block of data ("data block") may be written into one data buffer in a sequential manner, but is more likely fragmented into data blocks and non-sequentially written into more than one data buffer as shown in FIG. 1 in which, for example, forty (40) bytes of data are non-sequentially stored in three data buffers at starting data block addresses of 06H, 104H and 309H, where "H" indicates a hexadecimal address.

In the event that the data block needs to be transferred from host memory through a network system, it is usually desirable for each byte of the data block to be sequentially addressed (i.e., "byte packed"). This is normally accomplished by transferring the data block from host memory into an addressable, contiguous buffer. One primary reason for this type of byte packing is that networks usually transmit data in a continuous stream of data bytes to optimize performance. Thus, performance is degraded if the network is configured to transmit bytes containing invalid information.

Currently, a state machine is used to combine data from different data buffers into the single contiguous buffer if desired. A "state machine" is a collection of conventional logic or an Applied Specific Integrated Circuit ("ASIC") which receives inputs that are combined with its self-contained state information in order to "intelligently" control the combination of data from the different data buffers. However, the use of a state machine to control data combination poses a number of disadvantages.

One disadvantage is that this state machine is quite complex and thus, is difficult to design because it must account for every possible data buffer configuration having (i) any starting address within the predetermined address range and (ii) any arbitrary byte size. Another disadvantage is that a state machine is not modifiable (i.e., scalable) to accommodate data buffers supporting larger bit widths without dramatically altering the state machine and increasing its complexity. Thus, it would be desirous to provide an apparatus and corresponding method of operation that would overcome the above-identified disadvantages.

SUMMARY OF THE INVENTION

To optimize overall performance of a network comprising a number of systems each coupled to the network through a Network Interface Circuit ("NIC"), packing circuitry is implemented within the NIC. The packing circuitry comprises a word packing circuit and a byte packing circuit which are both scalable in design to accommodate any requisite bit width of an input/output ("I/O") bus of its host system or Transmit (TX) buffer memory. The word and byte packing circuits operate in combination to perform necessary packing of data without assistance of complex state machine circuitry.

The word packing circuit, coupled to the host system's I/O bus, being "N" bits wide, receives "N" bits of the data block in parallel ("N-bit data word") until all data associated with the data block is read. The word packing circuit is responsible for transmitting to the byte packing circuit only those words of the N-bit data word containing valid data. Thus, the word packing circuit may prevent a first word of the first N-bit data word from being transmitted to the byte packing circuit if it fails to contain any valid data. Moreover, the word packing circuit may preclude a last word of a last N-bit data word of the data block from being transmitted if it does not contain valid data. As the word packing circuit performs these operations, it serially outputs "R" bits of data in parallel to the byte packing circuit, where "R" is equal to the bit width of the TX buffer memory. In the event that "N" is two or more times greater in size than "R", multiple R-bit data words are necessary for each N-bit data word.

The byte packing circuit is coupled to the word packing circuit to receive the R-bit data word(s) and selectively routes bytes of the R-bit data word(s), temporarily stored in an input storage element and/or a save storage element, into an output storage element via a selector in order to avoid transmitting an invalid byte of data. A byte rotate circuit selects such routing based on byte position of valid data within the first R-bit data word.

BRIEF DESCRIPTION OF THE DRAWINGS

The features and advantages of the present invention will become apparent from the following detailed description of the present invention in which.

DETAILED DESCRIPTION OF THE INVENTION

In the following detailed description, the present invention describes an apparatus and method for byte packing through addition preferably, but not necessarily, implemented within a Network Interface Circuit ("NIC") of an asynchronous transfer mode ("ATM") network. A number of terms are frequently used to describe certain control circuits and binary representations which are defined herein. A "selector" is defined as one or more conventional multiplexing logic gates arranged in parallel to collectively output one of a plurality of multi-bit inputs. A "storage element" is defined as an array of registers arranged in parallel to collectively output multiple bits of data. "Data" generally refers to binary data and/or instructions unless otherwise specifically referenced. A "data block" is defined as a group of consecutively addressed bits stored in a data buffer. Lastly, a "data word" is a portion of the "data block" transmitted from the host memory to the NIC in parallel. Generally, the data word includes a number of "words" which are preferably 4 bytes (32-bits) in length but may be any "$2^x$" byte in length where $x \geq 0$.

Figure 2:
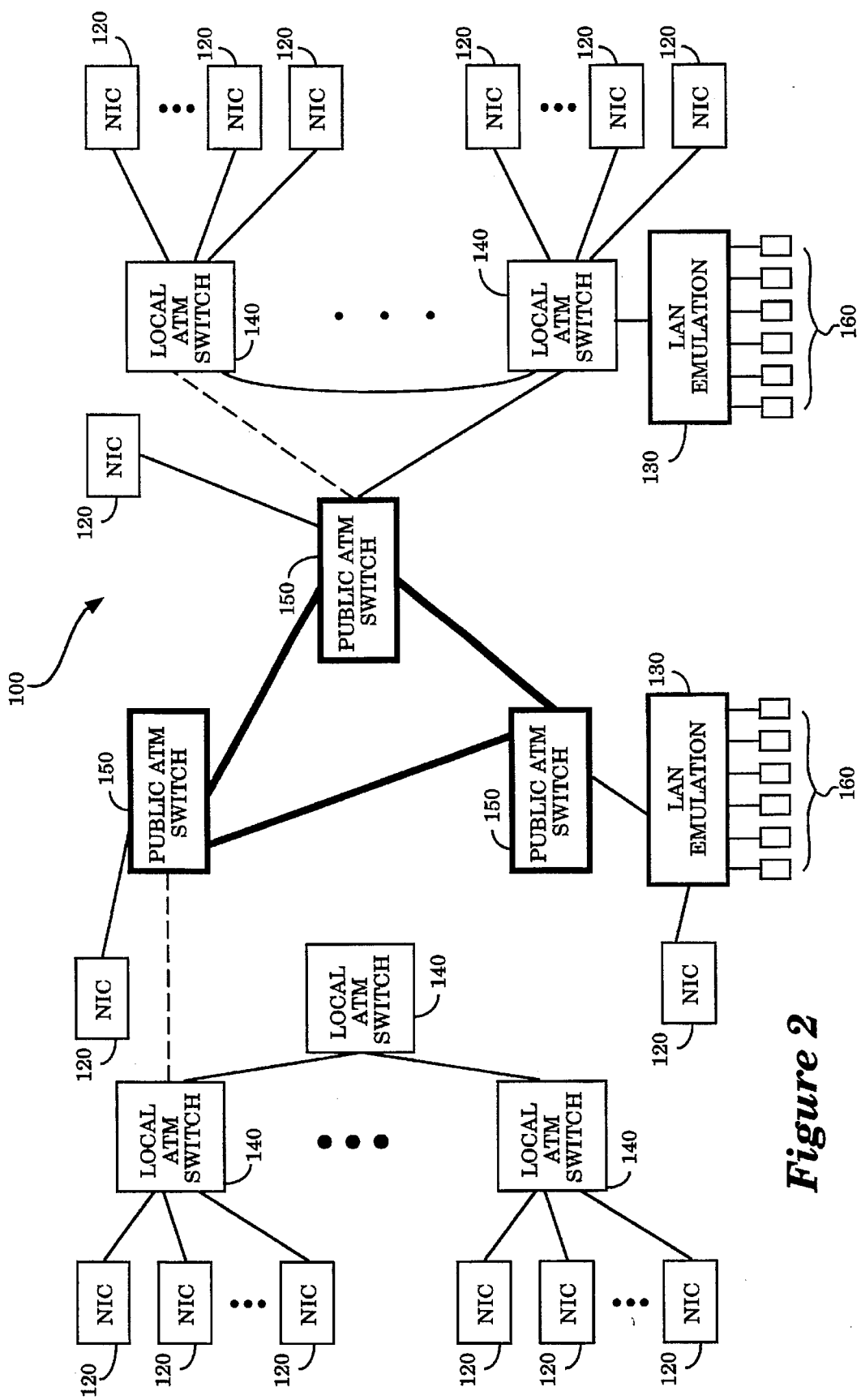
FIG. 2 is an illustrative block diagram of an ATM network including systems having host memory coupled together through switching circuitry and dedicated Network Interface Circuits.

Referring to FIG. 2, an exemplary network incorporating the Network Interface Circuit ("NIC") of the present invention is shown. The network 100 comprises various systems e.g., computer system (not shown) each of which incorporates host memory and a NIC 120 as shown. The NICs 120 may be coupled directly to a public ATM switch 150 or indirectly via a local ATM switch 140. Likewise, the local and public switches 140 and 150 may be coupled in any chosen scheme to provide communication paths between two or more systems. According to the quality of service (i.e., bit rate, acceptable timing loss, etc.) required, these local and public ATM switches 140 and 150 route data to support asynchronously transfers between applications running on systems remotely located from each other. As further shown in FIG. 2, the network 100 may also include systems which utilize local area network ("LAN") emulation 130 which serves as a gateway connecting other networks, such as Ethernet or Token Ring networks 160 which use ATM as a supporting framework.

Figure 3:
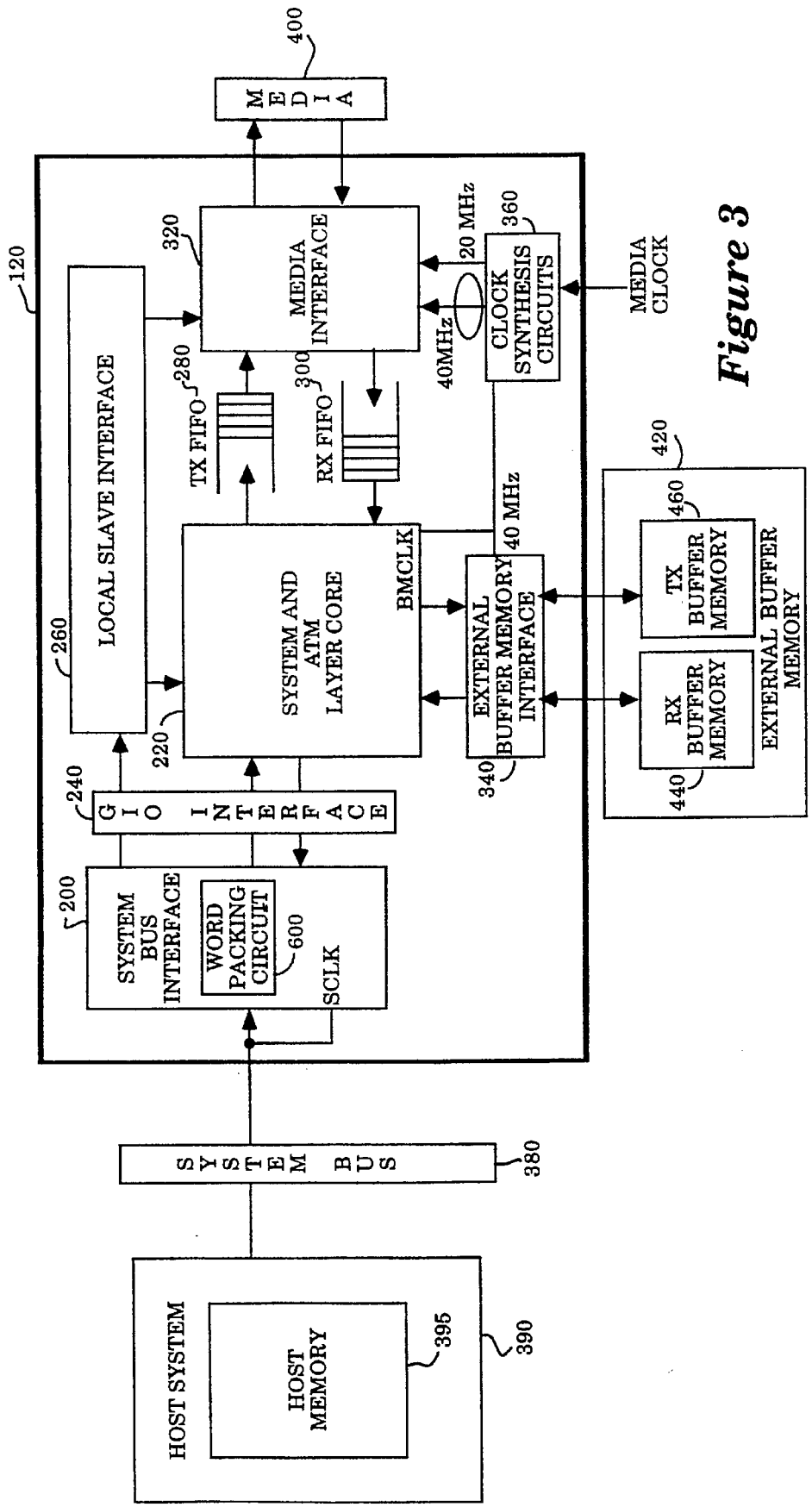
FIG. 3 is an illustrative block diagram of the Network Interface Circuit of FIG. 2 including a System and ATM Layer Core.

Referring now to FIG. 3, a simplified diagram illustrating the architecture of the NIC used in accordance with one of the systems of FIG. 2 (hereinafter referred to as a "host system") is shown. The NIC 120 interfaces the host system 390 coupled through an input/output ("I/O") bus (e.g., System Bus) 380 to the network media 400 operating in accordance with ATM protocol. The NIC 120 comprises a System Bus interface 200, a System and ATM Layer Core 220 which is coupled to the System Bus interface 200 via a Generic Input/Output ("GIO") interface 240, a Local Slave interface 260, an array of transmit ("TX") FIFOs 280, an array of receive ("RX") FIFOs 300, a Media interface 320, an External Buffer Memory interface 340 and Clock Synthesis circuit 360.

Together, the components 200–360 of the NIC 120 cooperate to asynchronously transfer data between the host system 390 and the other systems in the network through multiple, dynamically allocated channels in multiple bandwidth groups. In other words, the components of the NIC 120 collectively function as a multi-channel intelligent direct memory access (DMA) controller coupled to the System Bus 380 of the host system 390. In a preferred embodiment, multiple transmit and receive channels are serviced as virtual channels utilizing a full duplex 155/622 Mbps physical link. Multiple packets of data, subscribed to different channels over the System Bus 380 to external buffer memory 420 residing off the NIC 120 via the External Buffer Memory interface 340, are segmented by circuitry in the System and ATM Layer Core 220 into transmit cells for transmission to the Media 400 through Media interface 320.

The external buffer memory 420 includes RX buffer memory 440 and TX buffer memory 460 which preferably is a plurality of FIFOs, one FIFO corresponding to each channel of the network in order to support different data transfer rates.

As shown in FIG. 3, the System and ATM Layer Core 220 comprises segregated cellification and reassembly logic (not shown) to facilitate asynchronous cellification and reassembly of transmit and receive data cells, respectively. The cellification logic comprises circuitry for, among other things, packing bytes of data used within the transmit data cell.

The array of TX and RX FIFOs 280 and 300, coupled between the System and ATM Layer Core 220 and Media interface 320, are used to stage the transmit and receive cell payloads of the transmit and receive data cells respectively. The Media interface 320 transmits and receives these data cells to the Media 400 of the network, driven by clock signals provided by Clock Synthesis circuit 360. Preferably the Media 400, and therefore the Media interface 320, conforms to the Universal Test and Operations Physical interface for ATM ("UTOPIA") standard, as described by the ATM Form Ad Hoc specification. To conform to the UTOPIA specification, the clock synthesis circuit 360 provides either a clock signal of 20 MHz or 40 MHz to enable the Media interface 320 to support a byte stream at 20 MHz for 155 Mbps or a 16 bit stream at 40 MHz for a 622 Mbps data stream.

In the present embodiment, the Media interface 320 receives 52-byte data cells each having a 4-byte cell header and a 48-byte payload from the TX FIFO 280. The Media interface 320 inserts a checksum as a fifth byte to the cell header into each transmit cell prior to providing the 53-byte data cell to the Media 400. Conversely, when the Media interface 320 receives cells from the Media 400, it examines the checksum in the fifth byte of each receive cell to determine if the checksum is correct. If so, the byte representing the checksum is stripped from the receive cell and the receive cell is forwarded to the RX FIFO 300. Otherwise, the entire receive cell is disregarded.

The System Bus interface 200 and GIO interface 240 insulate the host system 390 from the specifics of the transfer to the Media 400. Furthermore, the System and ATM Layer Core 220 are insulated from the specifics of the system bus 380 and host specifics. In the present preferred embodiment, the System Bus is an S-Bus, as specified in the Institute of Electronics and Electrical Engineers ("IEEE") standard 1496 specification. The System Bus interface 200 is configured to communicate in accordance with the specifications of the System Bus, in the present illustration, the S-Bus. It is contemplated that the System Bus interface 200 can be configured to conform to different host system busses. The System Bus interface 200 is also configured to transfer and receive data in accordance with the protocols specified by the GIO interface 240. The GIO interface 240 provides a singular interface through which the System and ATM Layer Core 220 communicates with the host system and therefore, does not change for different embodiments of the NIC 120 which interface to different host systems and busses.

The host system 390 includes host memory 395 which contains data packets and pointers to the packets being transmitted and received. As noted previously, the NIC 120 also shields the cell delineation details of asynchronous transfer from the applications running on the host system 390. For present purposes, it is assumed that applications running on the host system 390 manage transmit and receive data using wrap around transmit and receive rings with packet interfaces as is well known in the art. However, the present invention may be practiced with the software applications running on the host system managing transmit and receive data using other data structures.

Figure 4:
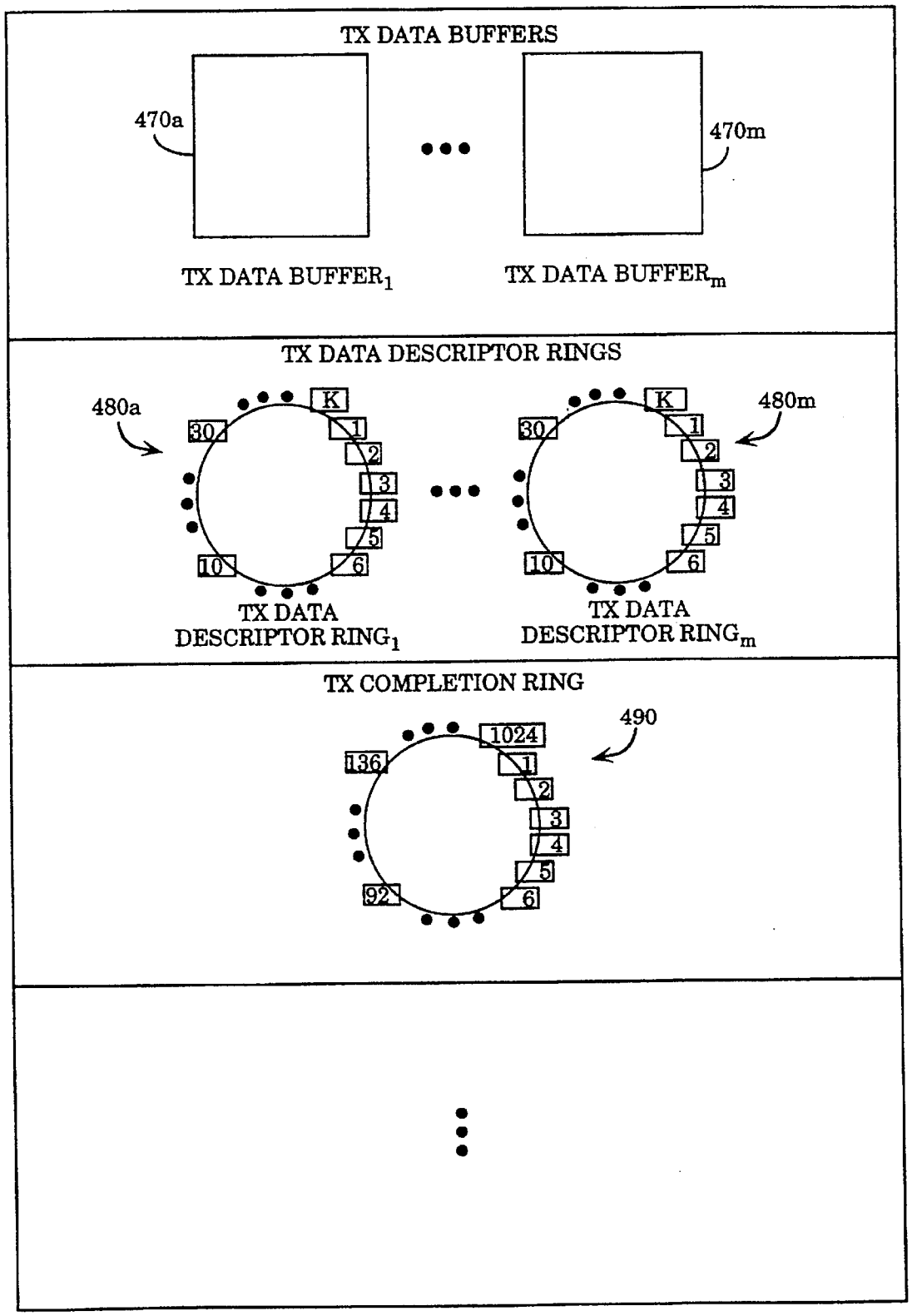
FIG. 4 is an illustrative block diagram of certain data structures of the host memory used by the Network Interface Circuit of FIG. 2 in transmitting data.

Referring now to FIG. 4, a general overview of the preferred data structure of the host memory used for data transmission is shown. The host memory includes transmit ("TX") data buffers 470a–470m, TX data descriptor rings 480a–480m and a TX completion ring 490. The TX data buffers 470a–470m, responsible for storing data to be transferred, are identical to the data buffers previously discussed.

The TX data descriptor rings 480a–480m are data structures corresponding in number to (i) the multiple channels, usually of different transfer data rates, supported by the NIC and (ii) the TX data buffers 470a–470m. Each TX data descriptor ring 480a–480m includes a plurality "K" of ring entries, numbered "1" to "K", which are accessed by software sequentially. The value of "K" is a whole number preferably at least equal to sixty-four. Each ring entry is of a sufficient size (e.g., 64 bytes) to provide storage for a "data descriptor" which includes at least one pointer to a location in its respective TX data buffer where portions of a desired data block are located. When a data descriptor is serially input into a ring entry and is queued to be subsequently read by a TX DMA engine of the NIC (discussed below), the software transmits an I/O command to the NIC. This I/O command contains as parameters the number of the TX data descriptor ring being used and the last ring entry of that TX data descriptor ring to receive a data descriptor. This is done to avoid polling the TX data descriptor ring by the NIC which would be costly to employ in most personal computer platforms and unnecessary when no data needs to be transmitted. The NIC keeps track of the last data descriptor, per TX data descriptor ring, that has been processed.

The TX completion ring 490 is a data structure having a plurality of ring entries which, unlike TX data descriptor rings 480a–480m, contain all necessary information in the ring entry rather than relying on pointers. The TX completion ring 490 is used to report to software which data words have been transferred to the TX buffer memory for segmentation. In a preferred embodiment, the TX completion ring 490 occupies up to 64 KBytes of host memory through 1,024 ring entries being 64 bytes aligned, although any configuration may be chosen. The TX completion ring 490 is accessible by both software and hardware requiring an OWN bit in each descriptor which is set when the NIC has ownership of the TX completion ring 490.

Figure 5:
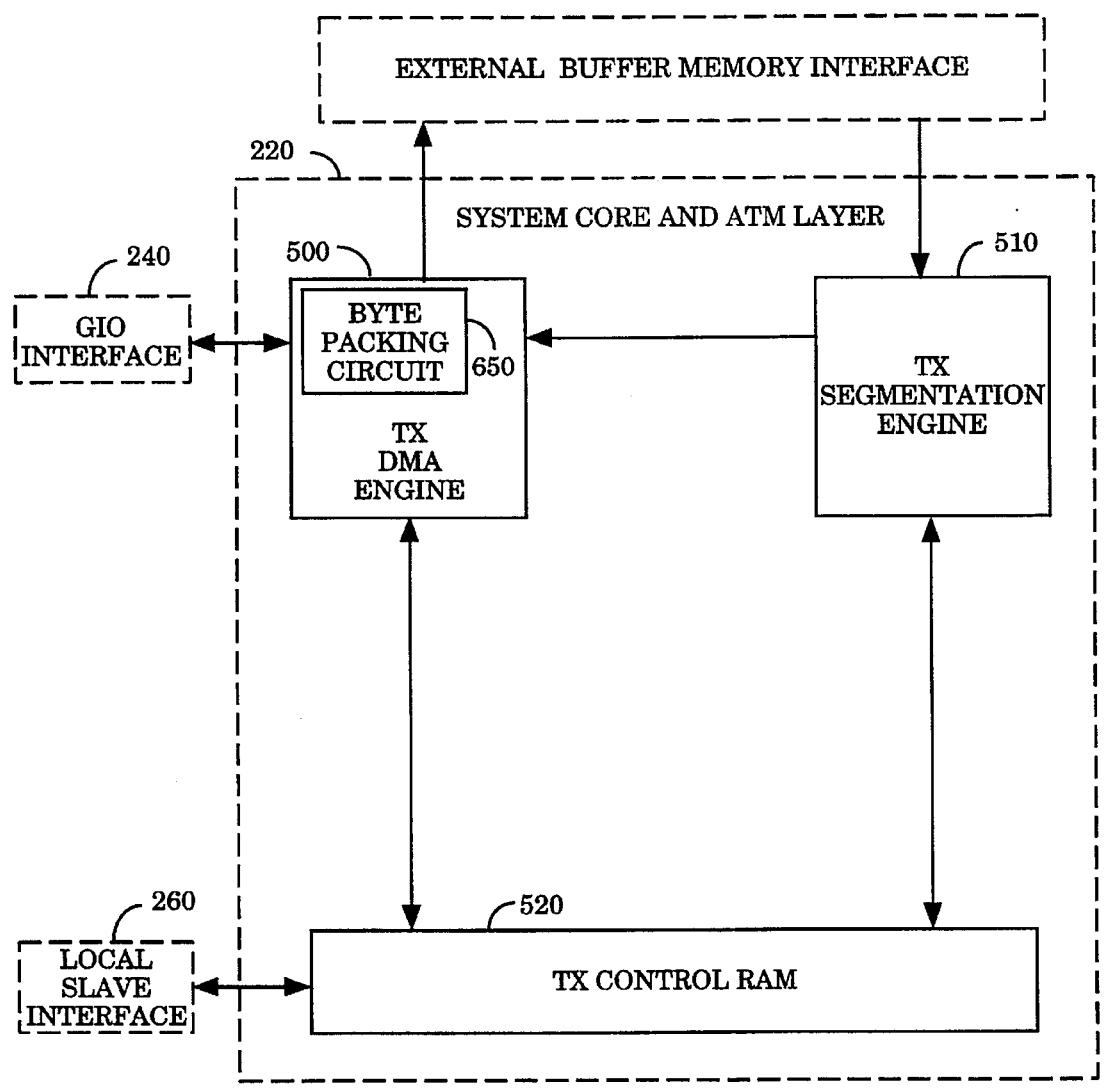
FIG. 5 is an illustrative block diagram of components implemented within the System and ATM Layer Core of the Network Interface Circuit for cellification.

Referring back to FIG. 3, one primary function of the System and ATM Layer Core 220 is to retrieve data from host memory and to perform packing operations on the data before temporarily storing the data within the TX buffer memory through packing circuitry; namely, a word packing circuit and a byte packing circuit. Thereafter, the data may be segmented into cells and transferred to the array of TX FIFOs. This is accomplished through the collective arbitrated operations of certain components of the cellification logic; namely, a TX DMA engine 500, a TX Segmentation engine 510 and a TX Control RAM 520, preferably with an interface as shown in FIG. 5.

The TX DMA engine 500 is responsible for retrieving data from host memory and byte packing the data for storage in the TX buffer memory by byte packing circuit 650. This enables the TX Segmentation engine 510 to more easily segment the data stored in the TX buffer memory 440 of FIG. 3 into payloads of the transmit data cells prior to transmission to an ATM switch. It is contemplated, however, that such byte packing may be used by any circuitry to transmit information across any type of network. The TX Control RAM 520 provides internal storage of information for use by the TX DMA engine 500 and the TX Segmentation Circuit 510. The operations of the TX Control RAM 520 in coordinating data transfer from a TX data buffer to the TX buffer memory is discussed in detail in a concurrently filed application by assignee entitled "Method and Apparatus for Coordinating Data Transfer between Hardware and Software" (Attorney Docket No. 82225.P0934) incorporated herewith by reference.

Figure 6A:
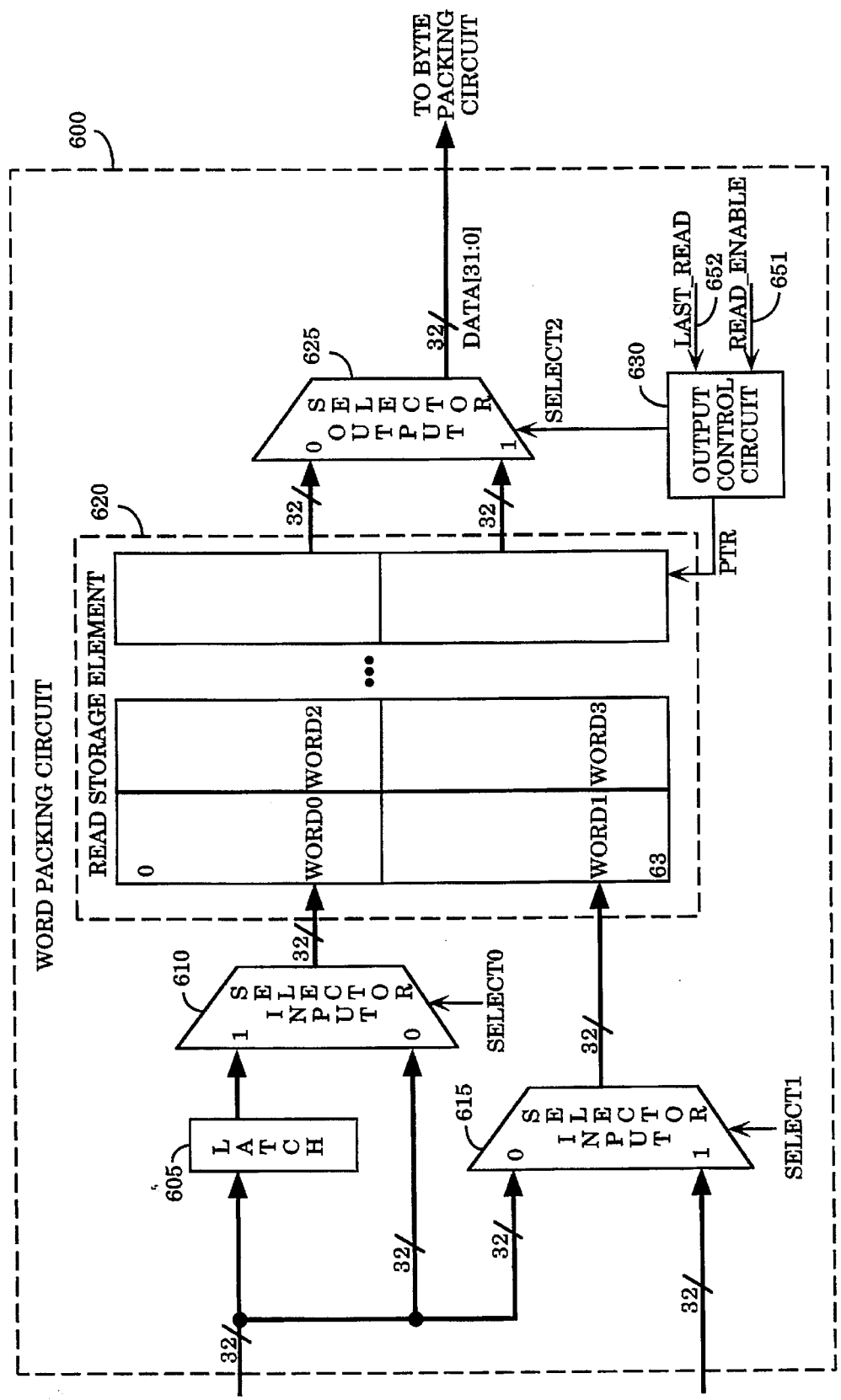
FIG. 6a is an illustrative block diagram of a word packing circuit implemented with the System Bus interface of FIGS. 3 and 5.
Figure 6B:
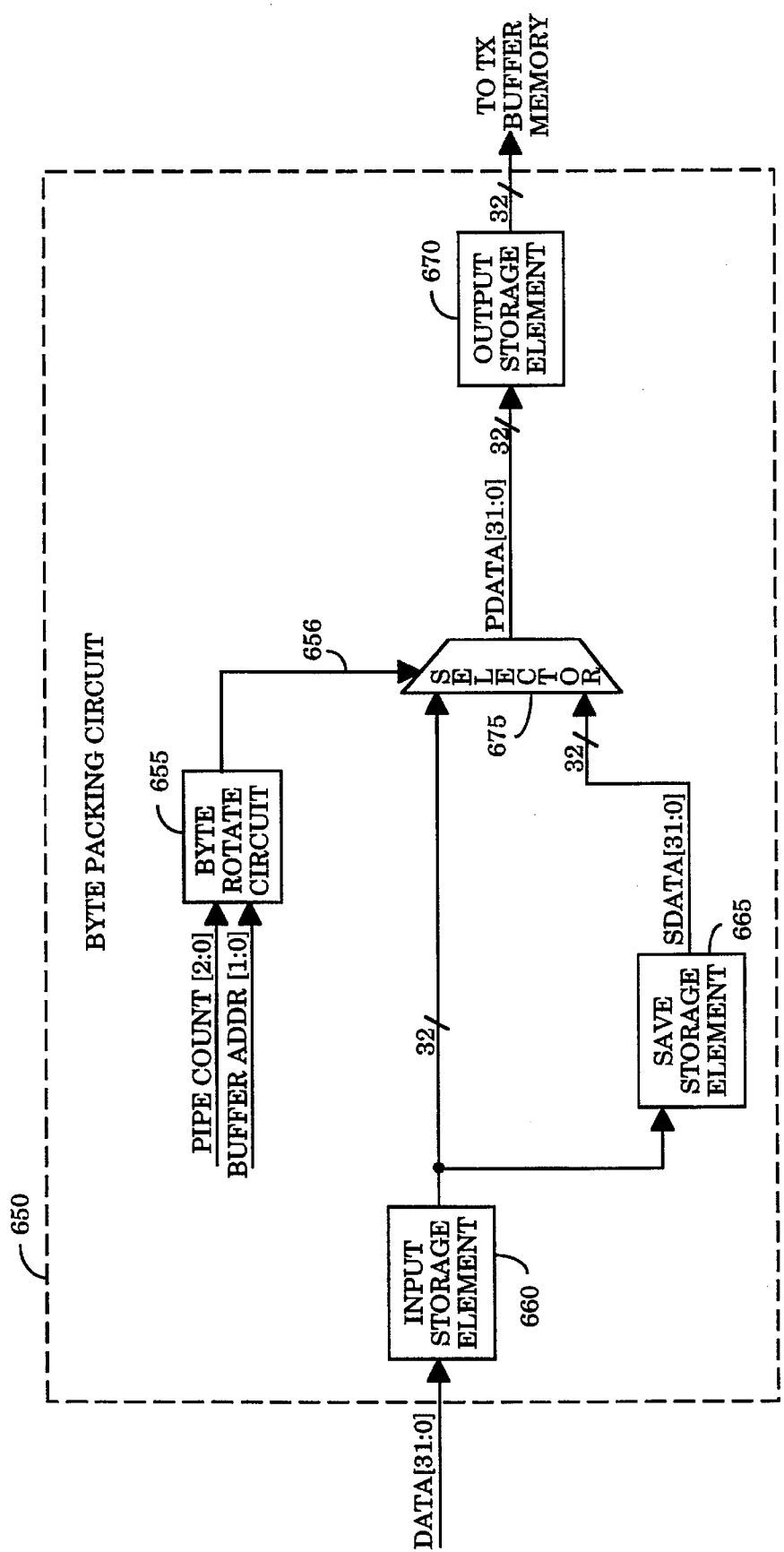
FIG. 6b is an illustrative block diagram of a byte packing circuit implemented with the TX DMA engine of FIG. 5.
Figure 6C:
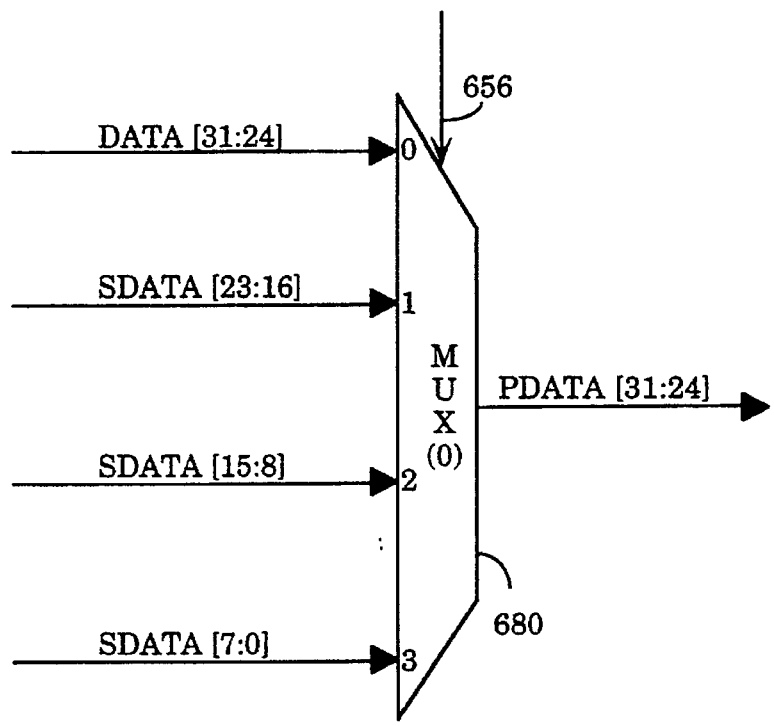
FIGS. 6c–6f are illustrative block diagrams of the selector of the byte packing circuit of FIG. 6b.
Figure 6D:
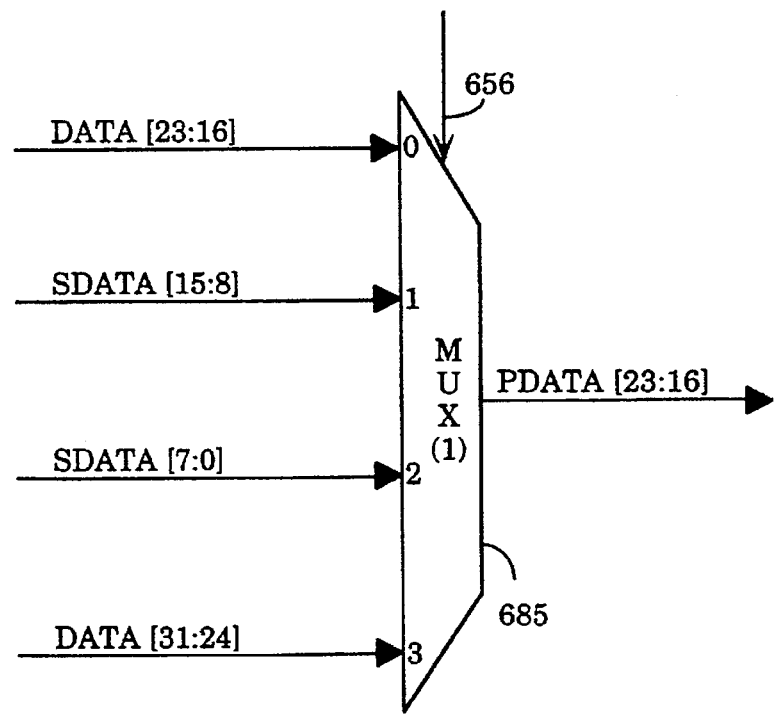
Figure 6E:
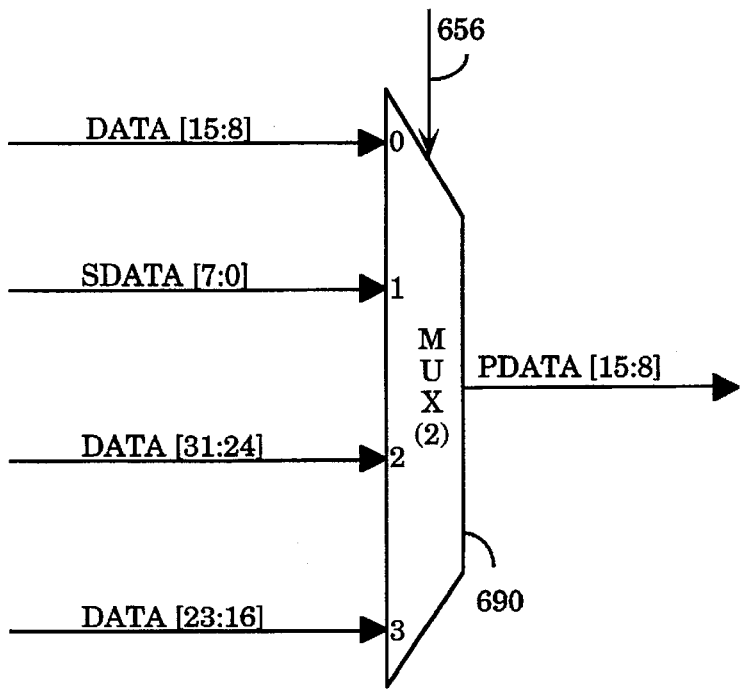
Figure 6F:
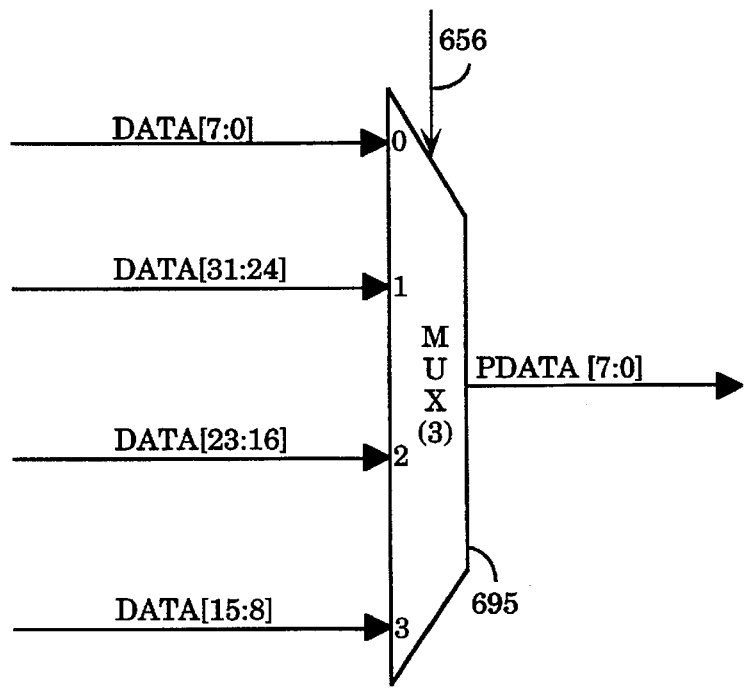

FIGS. 6a and 6b illustrate an embodiment of the packing circuitry mentioned above including a word packing circuit 600 and a byte packing circuit 650. The word packing circuit is employed within the System Bus interface 200 of FIG. 3 of which its output propagates through the GIO interface 240, although it is contemplated that the word packing circuitry may be implemented in any NIC component operating prior to the byte packing circuit 650. The word packing circuit 600 performs two necessary functions. One function is to transfer a "N-bit" data word into a "R-bit" word. The values of "N" and "R" are whole numbers corresponding to the bit widths of the system bus and TX buffer memory, respectively. The second function is to preclude an invalid word within the N-bit data word from being transferred to the byte packing circuit 650. The byte packing circuit 650, on the other hand, packs bytes of data by precluding invalid byte(s) from being transferred to the TX buffer memory. This "byte packing" is accomplished through selective addition.

For clarity sake, a word referred to as 32-bits of data and the system bus and TX buffer memory widths in the present embodiment are configured to have bit width of 64-bits and 32-bits, respectively. Thus, the word packing circuit 600 of FIG. 6a would be configured to support a data word up to 64-bits in width while the byte packing circuit of FIGS. 6b–6f would be configured to support a data word up to 32-bits in width. It is contemplated, however, that the present invention is easily scalable to support any bit widths of the system bus or TX buffer memory.

Referring now to FIG. 6a, the word packing circuit 600 includes a latch element 605, a first and second input selectors 610 and 615, a read storage element (e.g., a FIFO) 620, an output selector 625 and an output control circuit 630. The 64-bit data word is obtained from the system bus of FIG. 3 and separated into two 32-bit data words; namely, a lower data word having the least significant 32-bits of the 64-bit data word and an upper data word.

As shown, the lower data word is transferred into (i) the latch element 605, (ii) a first port of the first input selector 610 and (iii) a first port of the input second selector 615 during a first transfer cycle. The upper data word is input into a second port of the second input selector 610. These first and second input selectors 610 and 615 are configured to be disabled to prevent an invalid word (32-bits) from being written into the read storage element 620 by setting Select1 equal to logic "1" and Select0 equal to the value of bit 2 of the starting address of valid data within an associated TX data buffer of the host memory. It is contemplated that the configuration of the Select0,1 lines can be deduced for all sizes of the system bus (e.g., "00" for 32-bit system bus).

As data is transferred into the read storage element 620, the output control circuit 630 alternatively selects first and second parts of the output selector 625 to pass 32-bit portions of the read storage element 620 to the byte packing circuit 650 for byte packing upon receiving an active READ_ENABLE signal via bus line 651 generated by local controller (not shown) within the External Buffer Memory interface indicating that the TX buffer memory is able to receive data. Thereafter, the output control circuit 630 increments a pointer of the read storage element "PTR" to obtain further information. The output control circuit 630 further receives as input a LAST_READ signal via bus line 652 from a decremental counter (not shown) that decrements itself from each 32-bit data word transferred by the word packing circuit to the byte packing circuit. Before data transfer commences, the counter is reset to be the number of valid words in the data block as provided by the data descriptor. The LAST_READ signal, when active, indicates to the portion of the read storage element 620 being read contains the last data bytes of the data obtained from one of a number of TX data buffers. This is used to eliminate an invalid word trailing the last valid word.

Referring now to FIG. 6b, the byte packing circuit 650 comprises a byte rotate circuit 655, an input storage element 660, a save storage element 665, an output storage element 670 and a selector 675. The input storage element 660 receives Data[31:0] from the word packing circuit 600 and routes Data[31:0] to both the save storage element 665 and the selector 675. The save storage element 665 delays Data[31:0] by a single cycle and outputs the data (referred to as "SData[31:0]") into the selector 675. Thus, the selector 670 receives data input from both the input storage element 660 and the save storage element 665.

easily modified to accommodate a particular system configuration as shown below in Table B. These multiplexer groups 680, 685, 690 and 695 are commonly selected by the byte rotate circuit 655 via byte rotation select lines 656 which has the effect of selecting which inputs of each of the multiplexer groups 680, 685, 690 and 695 to pass for reliably byte packing data from the word packing circuit. This selection is based on the number of valid bytes in the pipeline "PIPE COUNT" (i.e., the number of bytes in the input, save and output storage elements at the start of reading a new data buffer) and starting address of first valid byte of first data word "BUFFER ADDR". As shown, the BUFFER ADDR is 2-bits since byte packing is performed for a 32-bit (4 byte) width. It is contemplated that the BUFFER ADDR may increase in bit number depending on the size of data words received. The byte rotate circuit 655 calculates a select value to be propagated through the byte rotation select lines 656. The select value is equal to the following value in equation 1:

$$\left[ \frac{R}{8} - (\text{PIPE COUNT}) \bmod \frac{R}{8} + (\text{BUFFER ADDR}) \right] \bmod \frac{R}{8} ; \qquad \text{Eqn. 1}$$

$$\text{where } \frac{\text{``}R\text{''}}{8} = \text{byte width of } TX \text{ buffer memory,}$$

From the above-identified equation, the possible data paths of the 32-bit embodiment is shown in Table A immediately below.

TABLE A

| SELECT VALUE | PDATA[31:24] | PDATA[23:16] | PDATA[15:8] | PDATA[7:0] |
|---|---|---|---|---|
| 00 | DATA[31:24] | DATA[23:16] | DATA[15:8] | DATA[7:0] |
| 01 | SDATA[23:16] | SDATA[15:8] | SDATA[7:0] | DATA[31:24] |
| 10 | SDATA[15:8] | SDATA[7:0] | DATA[31:24] | DATA[23:16] |
| 11 | SDATA[7:0] | DATA[31:24] | DATA[23:16] | DATA[15:8] |

The selector 675 includes four (4) multiplexer groups, namely "MUX (0)–(3)" 680, 685, 690 and 695, oriented in parallel to each other for collectively outputting one packed word of data "PData[31:0]" at a time as shown in FIGS. 6c–6f. In accordance with byte packing for a 32-bit width, these multiplexer groups 680, 685, 690 and 695 are routed as shown in order to perform byte packing without the necessity for a state machine. Moreover, to support 64-bit widths and larger, the multiplexers are scalable in being In general terms, for any data packet of size "R" corresponding to the bit-width of the TX memory buffer, byte packing is performed by configuring the plurality of multiplexer groups to each output a predetermined amount ("T") of packed data, such as a byte as shown above or any given bit width, according to Table B presented below. Each multiplexer group is chosen to output 8-bits of data so "T" is equal to "8" although the multiplexer group could be configured to support any bit size.

TABLE B

| MULTIPLEXER GROUP | INPUT | OUTPUT |
|---|---|---|
| MUX(0) | DATA [R–1:R–T] AND select value = 0; SDATA [R–(T+1):R–2T] AND select value =1; SDATA [R–(T+1):R–3T] AND select value =2; . . . SDATA [T–1:0] AND select value = T–1. | PDATA [R–1:R–T] |
| MUX(1) | DATA [R–(T+1):R–2T] AND select value = 0; SDATA [R–(2T+1):R–3T] AND select value =1; SDATA [R–(3T+1):R–4T] AND select value =2; | PDATA [R–(T+1):R–2T] |

TABLE B-continued

| MULTIPLEXER GROUP | INPUT | OUTPUT |
|---|---|---|
| . | | |
| MUX(2) | SDATA [T–1:0] AND select value T–2; and DATA [R–1:R–T] AND select value = T–1. DATA [R–(2T+1):R–3T] AND select value = 0; SDATA [R–(3T+1):R–4T] AND select value = 1; SDATA [R–(4T –1):R–5T] AND select value = 2; | PDATA [R–(2T+1):R–3T] |
| . | | |
| MUX $\left( \frac{R}{8} - 1 \right)$ | SDATA [T–1:0] AND select value = T–3; DATA [R–1:R–T] AND select value = T–2; and DATA [R–(T+1):R–2T] AND select value = T–1. DATA [T–1:0] AND select value =0; DATA [R–1:R–T] AND select value = 1; | PDATA [T–1:0] |
| . | | |
| | DATA [2T–1:T] AND select value =T=1. | |

Referring now to FIGS. 7a–7i, in order to clarify the operations of the present invention, a specific example has been created for the sole purpose of explaining the byte packing with addition technique. This specific example should not be construed in any way as a limitation on the scope of the present invention.

Figure 1:
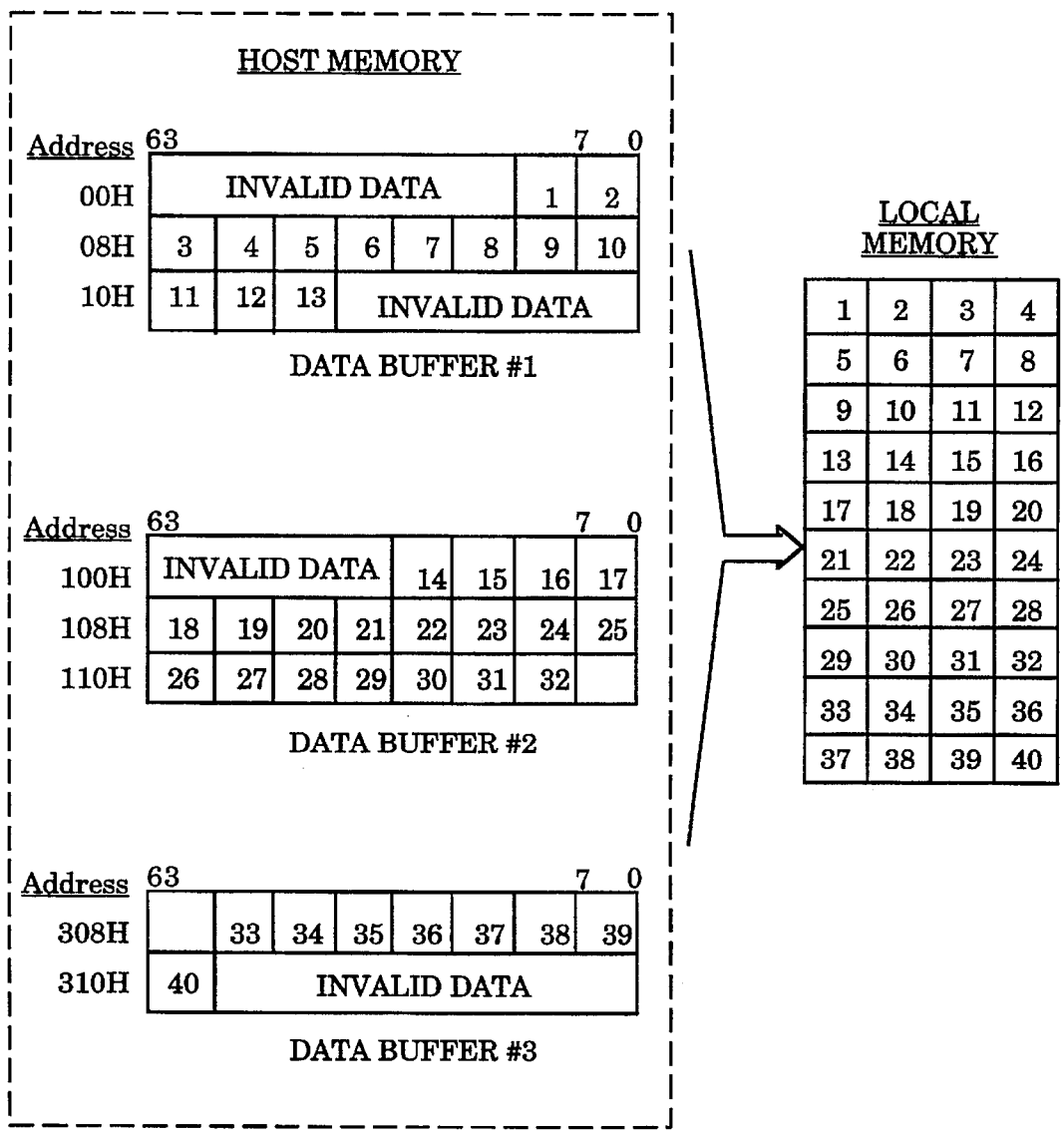
FIG. 1 is a block diagram of multiple data buffers storing information at arbitrarily chosen starting data block addresses 06H, 104H and 309H.
Figure 7A:
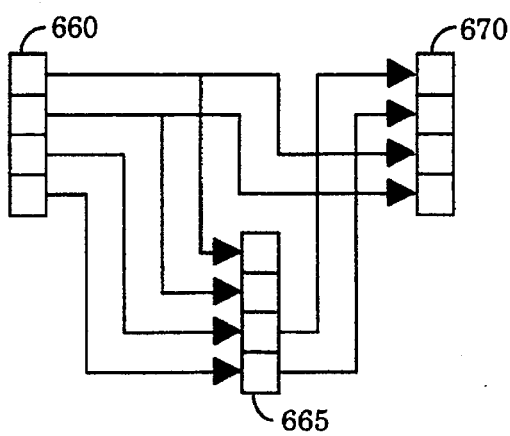
FIGS. 7a–7i illustrate data paths undertaken by the input, save and output storage elements of the byte packing circuit of FIG. 6b in order to byte pack those data blocks of FIG. 1.
Figure 7B:
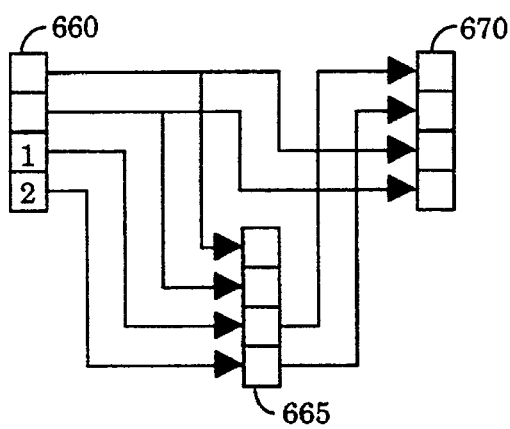
Figure 7C:
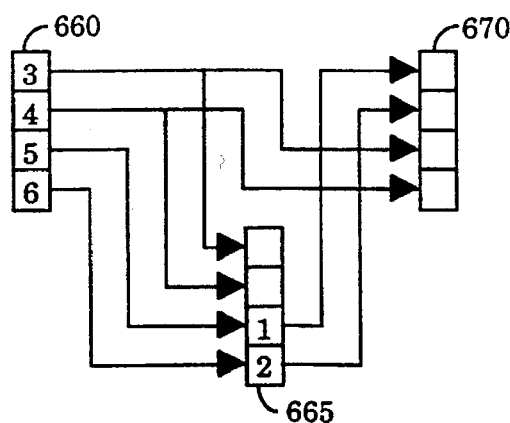
Figure 7D:
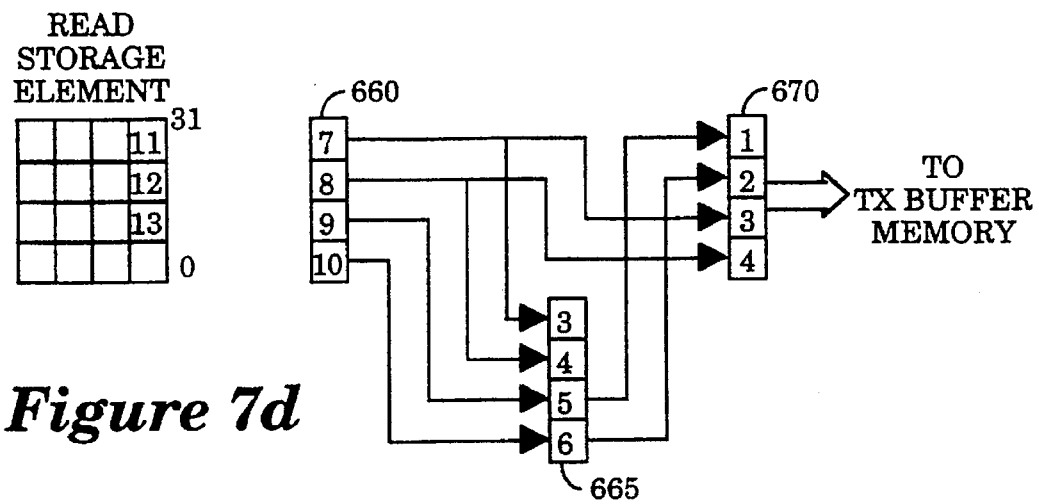
Figure 7E:
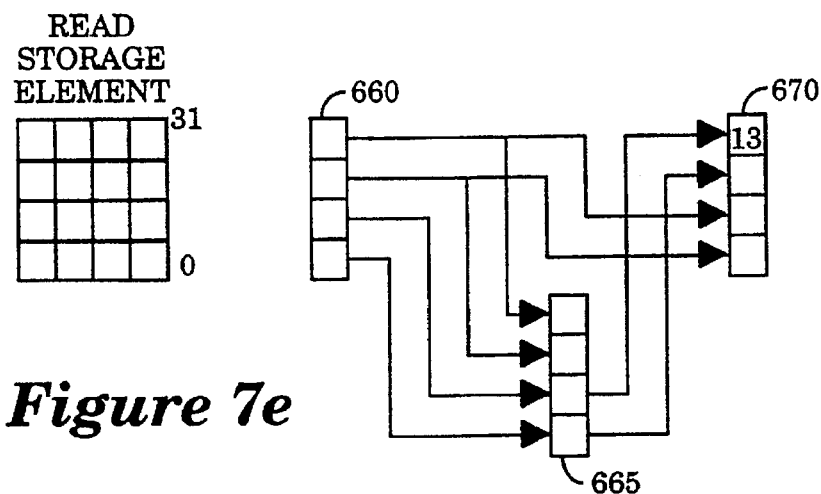

Using the data buffers illustrated in FIG. 1, as the word packing circuit eliminates an invalid word preceding a first 32-bit data word containing valid data bytes 1 and 2 as well as the invalid word at address 14H trailing the last 32-bit data word associated with the data of a first TX data buffer, the byte packing circuit is further packing data before storage into the TX buffer memory. Just prior to the word packing circuit starting its transfer of a first sequence of 32-bit data words of a data block to the byte packing circuit as shown in FIG. 7a, the byte rotate circuit calculates the select value to be output to the selector 675 (not shown) which, in this case, is equal to "2" (i.e., (4–0+2)mod 4). Thus, in the first cycle, valid bytes data 1–2 are transferred into the input storage element 660 (see FIG. 7b). In the next cycle, bytes 1–2 are transferred into the save storage element 665 while bytes 3–6 are transferred into the input storage element 660 (see FIG. 7c). Bytes 1–2 from the save storage element 665 and bytes 3–4 from the input storage element 660 are transferred to the output storage element 670 while bytes 3–6 are transferred into the save storage element 665 and bytes 7–10 are transferred into the input storage element 660 (see FIG. 7d). This process continues until byte 13 only resides in the output storage element 670 (see FIG. 7e). However, to maintain byte packing, byte 13 is not transferred from the output storage element 670 to the TX buffer memory until the output storage element is full or unless the data is the last valid byte of data to be transferred to the TX buffer memory as indicated by LAST_READ signal.

Figure 7F:
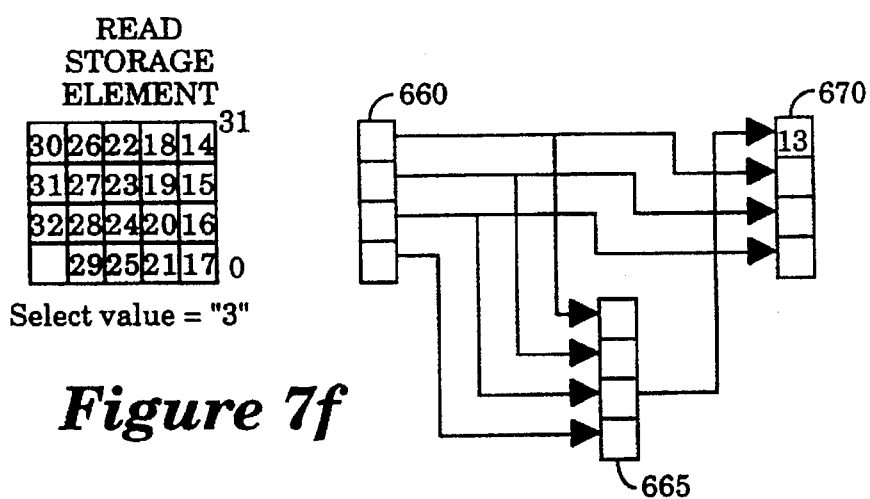
Figure 7G:
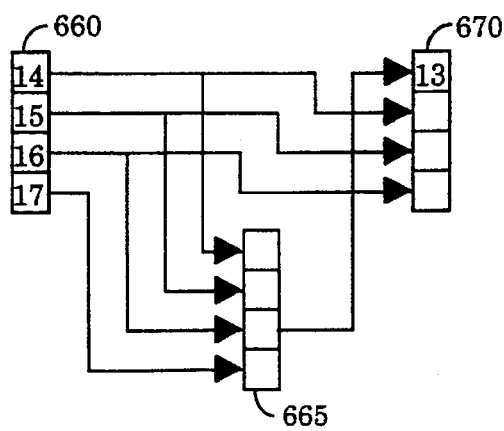
Figure 7H:
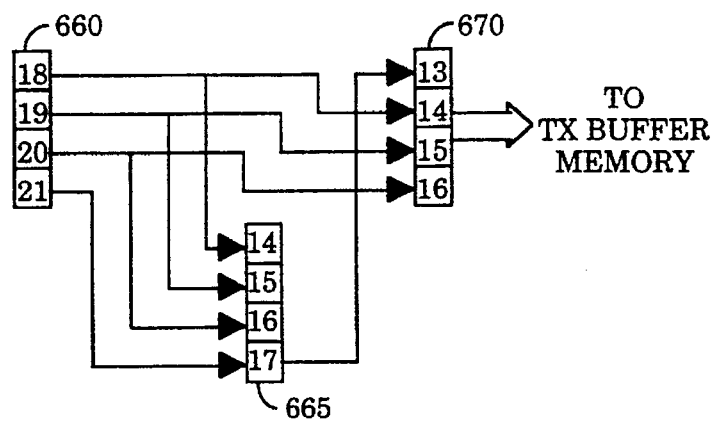

For the second sequence of data words associated with a second TX data buffer, the byte rotate circuit re-calculates the select value which is equal to 3 (i.e., (4–1+0)mod 4) as shown in FIG. 7f. Thus, for the first cycle, bytes 14–17 are transferred into the input storage element 660 (see FIG. 7g). In the next cycle, bytes 14–17 are input into the save storage element 665, bytes 14–16 are transferred into the output storage element 670 and bytes 18–21 are transferred into the input storage element 660 (see FIG. 7g). In the next cycle, byte 17 from the save storage element 665 is transferred into the output storage element 270, bytes 18–21 are transferred into the save storage element 665 and bytes 23–25 are transferred into the input storage element 660. The same process continues until bytes 29–32 are transferred into the output storage element 670.

Figure 7I:
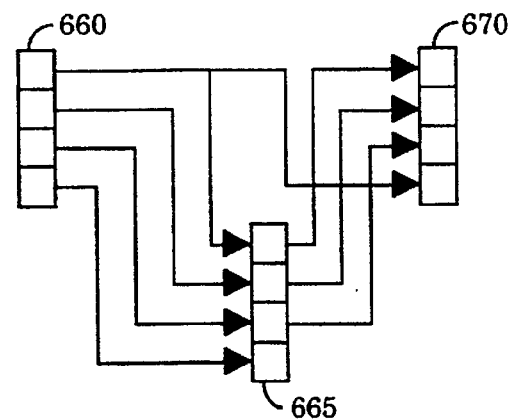

Thereafter, after configuring data from the third TX data buffer the byte rotate circuit 630 re-calculates the select value to be "1" (i.e., (4–0+1)mod 4) as shown in FIG. 7i. The process continues similar to our discussion above except that three byte values are transferred from the save storage element 665 instead of "2" and "1" bytes as shown for the first and second sequence of data words.

Figure 8:
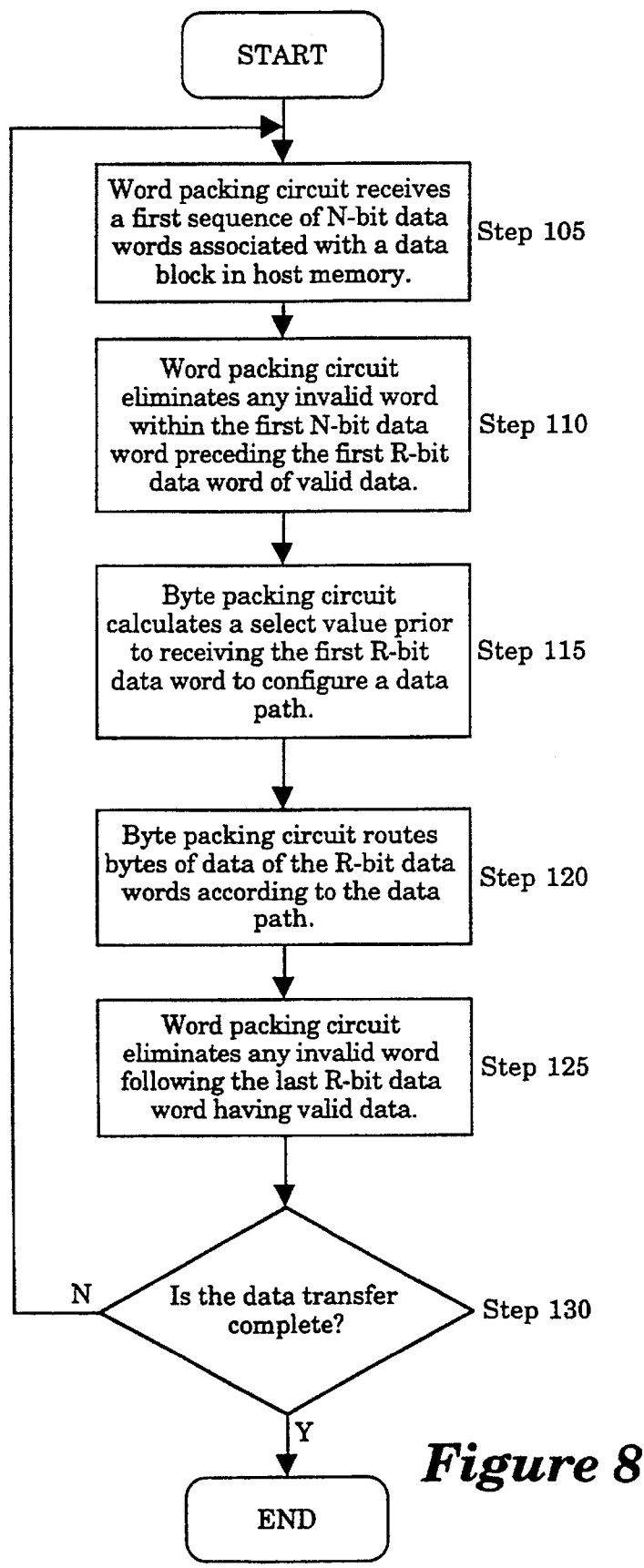
FIG. 8 is a flowchart illustrating the operational steps of the word and byte packing circuits of FIGS. 6a and 6b.

Referring now to FIG. 8, a flowchart illustrating the collective operations of the word and byte packing circuits of FIGS. 6b–6f is shown. In Step 105, the word packing circuit receives a first sequence of data words having a first bit width from host memory. These data words are portions of a data block stored in a single TX data buffer. In Step 110, the word packing circuit eliminates an invalid word, if any, within the first data word preceding valid data by refraining from propagating the invalid word through the word packing circuit.

Next, in Step 115, upon detecting that the word packing circuit is ready to transmit data, a byte rotate circuit within the byte packing circuit calculates a select value configuring the appropriate data path between the input, save and output storage elements 660, 665 and 670. This data path is used to effectively add bytes of data from one word to another to "byte pack" the output data packet transferred to the TX buffer memory (Step 120). Then, in Step 125, the word packing circuit eliminates an invalid word within the last data word of the first sequence of data words by incrementing a pointer to the read storage element. Finally, in Step 130, a determination is made as to whether the transfer of the first sequence of data words completes the data transfer of the data block before transferring any remaining bytes in the output storage element to the TX buffer memory. If so, the data transfer is complete. Otherwise, the word and byte packing circuits continue its packing operations on a subsequent data blocks associated with other TX data buffers.

The present invention described herein may be designed in many different methods and using many different configurations. While the present invention has been described in terms of various embodiments, other embodiments may come to mind to those skilled in the art without departing from the spirit and scope of the present invention. Numerous specific details were set forth although it is apparent, to one skilled in the art, that the present invention may be practiced without incorporating these specific details. In some instances, however, well-known circuits and the like were not set forth in detail in order to avoid unnecessarily obscuring the present invention. The invention should, therefore, be measured in terms of the following claims.

What is claimed is:

1. A circuit for packing data transferred between a first memory element and a second memory element through addition, the circuit comprising:
    a word packing circuit including a data input and a data output, said word packaging circuit being configured to receive a first sequence of data words each having a first bit width through the data input and to serially transfer a second sequence of data words each containing valid data and having a second bit width differing from said first bit width through the data output; and
    a byte packing circuit coupled to the data output of the word packing circuit, said byte packing circuit being configured to (i) receive the second sequence of data words and (ii) produce a third sequence of data words each having the second bit width to be stored in the second memory element, the third sequence of data words including only valid data provided by the second sequence of data words.

2. The circuit according to claim 1, wherein said word packing circuit includes
    a read storage element;
    a plurality of input selectors coupled to said read storage element and the data input, said plurality of input selectors being configured to segment each data word of the first sequence of data words into a plurality of data words having the second bit width and to transfer each of the plurality of data words containing valid data to said read storage element;
    a control circuit coupled to said read storage element, said control circuit being configured to control said read storage element in sequentially transferring each of the plurality of data words containing valid data to an output selector; and
    said output selector coupled to said read storage element, said control circuit and the data output, said output selector being configured to transfer the second sequence of data words to said byte packing circuitry, the second sequence of data words consisting of the plurality of data words containing valid data.

3. The circuit according to claim 2, wherein said plurality of input selectors segment each data word of the first sequence of data words into the plurality of data words, provided the first bit width is $2^x$ times greater in size than the second bit width and "x" is a whole number greater than zero.

4. The circuit according to claim 1, wherein the word packing circuit includes
    a read storage element;
    a plurality of input selectors coupled to said read storage element and the data input, said plurality of input selectors being configured to transfer the first sequence of data words into said read storage element;
    a control circuit coupled to said read storage element, said control circuit being configured to control said read storage element to sequentially transfer the first sequence of data words to an output selector; and
    said output selector coupled to said read storage element, said control circuit and said data output, said output selector being configured to transfer the second sequence of data words to said byte packing circuitry, the second sequence of data words being identical to the first sequence of data words.

5. The circuit according to claims 1 or 2 or 4, wherein said byte packing circuit includes
    an input storage element configured to receive (i) a first data word of the second sequence of data words in a first cycle and (ii) a second data word of the second sequence of data words in a second cycle;
    a save storage element coupled to the input storage element, said save storage element being configured to receive the first data word of the second sequence of data words in the second cycle;
    a selecting element coupled to said input storage element and said save storage element, said selecting element being configured to route at least a first portion of the first data word of the second sequence of data words to an output storage element; and
    said output storage element coupled to said selecting element, said output storage element being configured to transfer a first data word of the third sequence of data words to said second memory element in a third cycle.

6. The circuit according to claim 5, wherein said selecting element further routes data of the second data word of the second sequence of data words to said output storage element, provided a second portion of the first data word of the second sequence of data words contains invalid data.

7. The circuit according to claim 5, wherein said selecting element includes
    a selector including a plurality of multiplexer logic gates arranged in parallel; and
    a byte rotate circuit coupled to said selector via a plurality of select lines, said byte rotate circuit being configured to transmit a select value along the plurality of select lines in order to control the selector in routing data to the output storage element from either the input storage element or the save storage element.

8. The circuit according to claim 7, wherein said byte rotate circuit calculates the select value according to the following equation:

$$(R/8[[R/8]-(\text{Pipe Count})\bmod R/8 + \text{Buffer[Addr]}\bmod]\text{Addr})\bmod R/8,$$

wherein,
    "R/8" is a number equal to a byte width of the second memory element,
    "Pipe Count" is a number equal to the number of bytes of data within said input storage element, save storage element and output storage element prior to transmitting the second sequence of data words into the byte packing circuit, and
    "Buffer Addr" is a number equal to the number of invalid bytes preceding a first valid byte of the first data word of the second sequence of data words.

9. A network interface circuit coupling a host system to a network media, the network interface circuit comprising:
    a transmit buffer memory configured with a second bit width;
    a system bus interface configured to establish a connection with a data bus of the host system, said data bus having a first bit width;

a system and ATM layer core coupled to the transmit buffer memory and the system bus interface, said system and ATM layer core being configured to receive a first sequence of data words placed on the data bus and to pack valid data provided by the first sequence of data words prior to storing the data within said transmit buffer memory, the system and ATM layer core including a word packing circuit being configured to receive the first sequence of data words and to serially transfer a second sequence of data words each containing valid data and having the second bit width differing from said first bit width, and a byte packing circuit coupled to the word packing circuit, said byte packing circuit being configured to (i) receive in serial the second sequence of data words and (ii) produce a third sequence of data words each having the second bit width to be stored in the transmit buffer memory, the third sequence of data words including only valid data provided by the second sequence of data words.

10. The network interface circuit according to claim 9, wherein said word packing circuit includes a read storage element;

a plurality of input selectors coupled to said read storage element, said plurality of input selectors being configured to segment each data word of the first sequence of data words into a plurality of data words having the second bit width and to transfer each of the plurality of data words containing valid data to said read storage element;

a control circuit coupled to said read storage element, said control circuit being configured to control said read storage element in sequentially transferring each of the plurality of data words containing valid data to an output selector; and said output selector coupled to said read storage element and said control circuit, said output selector being configured to transfer the second sequence of data words to said byte packing circuitry, the second sequence of data words consisting of said plurality of data words containing valid data.

11. The network interface circuit according to claim 10, wherein said plurality of input selectors segment each data word of the first sequence of data words into the plurality of data words, provided the first bit width is $2^x$ times greater in size than the second bit width and "x" is a whole number greater than zero.

12. The network interface circuit according to claim 9, wherein the word packing circuit includes a read storage element;

a plurality of input selectors coupled to said read storage element, said plurality of input selectors being configured to transfer the first sequence of data words into said read storage element;

a control circuit coupled to said read storage element, said control circuit being configured to control said read storage element to sequentially transfer the first sequence of data words to an output selector; and said output selector coupled to said read storage element and said control circuit, said output selector being configured to transfer the second sequence of data words to said byte packing circuitry, the second sequence of data words being identical to the first sequence of data words.

13. The network interface circuit according to claims 9, wherein said byte packing circuit includes an input storage element configured to receive from the read storage element (i) a first data word of the second sequence of data words in a first cycle and (ii) a second data word of the second sequence of data words in a second cycle;

a save storage element coupled to the input storage element, said save storage element being configured to receive the first data word of the second sequence of data words in the second cycle;

a selecting element coupled to said input storage element and said save storage element, said selecting element being configured to route at least one byte data of the first data word of the second sequence of data words to an output storage element; and said output storage element coupled to said selecting element, said output storage element being configured to transfer a first data word of the third sequence of data words to said transmit buffer memory in a third cycle.

14. The network interface circuit according to claim 13, wherein said selecting element routes data from both the first and second data words of the second sequence of data words, provided a portion of the first data word of the second sequence of data words contains invalid data.

15. The network interface circuit according to claim 13, wherein said selecting element includes a selector including a plurality of multiplexer logic gates arranged in parallel; and a byte rotate circuit coupled to said selector via a plurality of select lines, said byte rotate circuit being configured to transmit a select value along the plurality of select lines in order to control the selector in routing data to the output storage element from either the input storage element or the save storage element.

16. The network interface circuit according to claim 15, wherein said byte rotate circuit calculates the select value according to the following equation:

(R/8[[R/8]–(Pipe Count)mod R/8+Buffer[Addr]mod]Addr)mod R/8, wherein,

"R/8" is a number equal to a byte width of the second memory element,

"Pipe Count" is a number equal to the number of bytes of data within said input storage element, save storage element and output storage element prior to transmitting the second sequence of data words into the byte packing circuit, and "Buffer Addr" is a number equal to the number of invalid bytes preceding a first valid byte of the first data word of the second sequence of data words.

17. A network comprising:

a network media; and a host system coupled to said network media, said host system being configured to transfer data through said network media, said host system including a circuit for packing the data for transmission, said circuit including a word packing circuit being configured to receive a first sequence of data words and to serially transfer a second sequence of data words each containing valid data and having a second bit width, and a byte packing circuit coupled to the word packing circuit, said byte packing circuit including an input storage element, a save storage element coupled to said input storage element, a selecting element coupled to said input storage element and said save storage element, and an output storage element coupled to said selecting element.

18. A network interface circuit comprising:

a local buffer memory configured with a second bit width; and a core circuit coupled to said local buffer memory, said core circuit being configured to receive a first sequence of data words each having a first bit width and to store valid data of the first sequence of data words into said local buffer memory, said core circuit including a word packing circuit being configured to receive the first sequence of data words and to serially transfer a second sequence of data words each containing valid data and having the second bit width differing from the first bit width, and a byte packing circuit coupled to the word packing circuit, said byte packing circuit being configured to (i) receive in serial the second sequence of data words and (ii) produce a third sequence of data words each having the second bit width to be stored in the transmit buffer memory, the third sequence of data words including only valid data provided by the second sequence of data words.

19. The network interface circuit according to claims 18, wherein said byte packing circuit includes an input storage element configured to receive (i) a first data word of the second sequence of data words in a first cycle and (ii) a second data word of the second sequence of data words in a second cycle;

a save storage element coupled to the input storage element, said save storage element being configured to receive the first data word of the second sequence of data words in the second cycle;

a selecting element coupled to said input storage element and said save storage element, said selecting element being configured to route at least a first portion of the first data word of the second sequence of data words to an output storage element; and said output storage element coupled to said selecting element, said output storage element being configured to transfer a first data word of the third sequence of data words to said transmit buffer memory in a third cycle.

20. The circuit according to claim 5, wherein the first potion of the first data word includes at least one byte of data.

21. A circuit for packing data transferred between a first memory element and a second memory element, the circuit comprising:

a word packing circuit configured to (i) receive a first sequence of data words each having a first bit width and (ii) transfer a second sequence of data words each having a second bit width; and a byte packing circuit coupled to the word packing circuit, the byte packing circuit including an input storage element configured to receive (i) a first data word of the second sequence of data words in a first cycle and (ii) a second data word of the second sequence of data words in a second cycle, a save storage element coupled to the input storage element, said save storage element configured to receive the first data word in the second cycle, a selecting element coupled to said input storage element and said save storage element, and an output storage element coupled to said selecting element, said output storage element being configured to transfer a data word of a third sequence of data words in a third cycle, the data word including data from both the first data word and the second data word when a portion of the first data word includes invalid data.

22. A method of data packing comprising the steps of:

receiving a first sequence of data words each having a first bit width;

removing data words of the first sequence of data words that fail to contain valid data to produce a second sequence of data words having a second bit width; and calculating a select value by a byte rotate circuit to set a propagation path of data of the second sequence of data words by routing data from a first data word of the second sequence of data words to a save storage element in a first cycle and routing said data from the first data word along with data from a second data word to an output storage element in a second cycle.

* * * * *

UNITED STATES PATENT AND TRADEMARK OFFICE
CERTIFICATE OF CORRECTION

PATENT NO.   : 5,638,367
DATED        : June 10, 1997
INVENTOR(S)  : Gaytan et al.

It is certified that error appears in the above-identified patent and that said Letters Patent is hereby corrected as shown below:

In column 12, claim 8 at line 47-48, please delete " (R/8 [[R/8]-(Pipe Count)mod R/8 + Buffer[Addr]mod]Addr)mod R/8, " and insert -- (R/8-(Pipe Count)mod R/8 + BufferAddr)mod R/8, In column 14, claim 16 at line 38-49, please delete " (R/8 [[R/8]-(Pipe Count)mod R/8 + Buffer[Addr]mod]Addr)mod R/8, " and insert -- (R/8-(Pipe Count)mod R/8 + BufferAddr)mod R/8, Signed and Sealed this Fourth Day of November, 1997

Attest:

BRUCE LEHMAN

Attesting Officer

Commissioner of Patents and Trademarks